Figure 1:
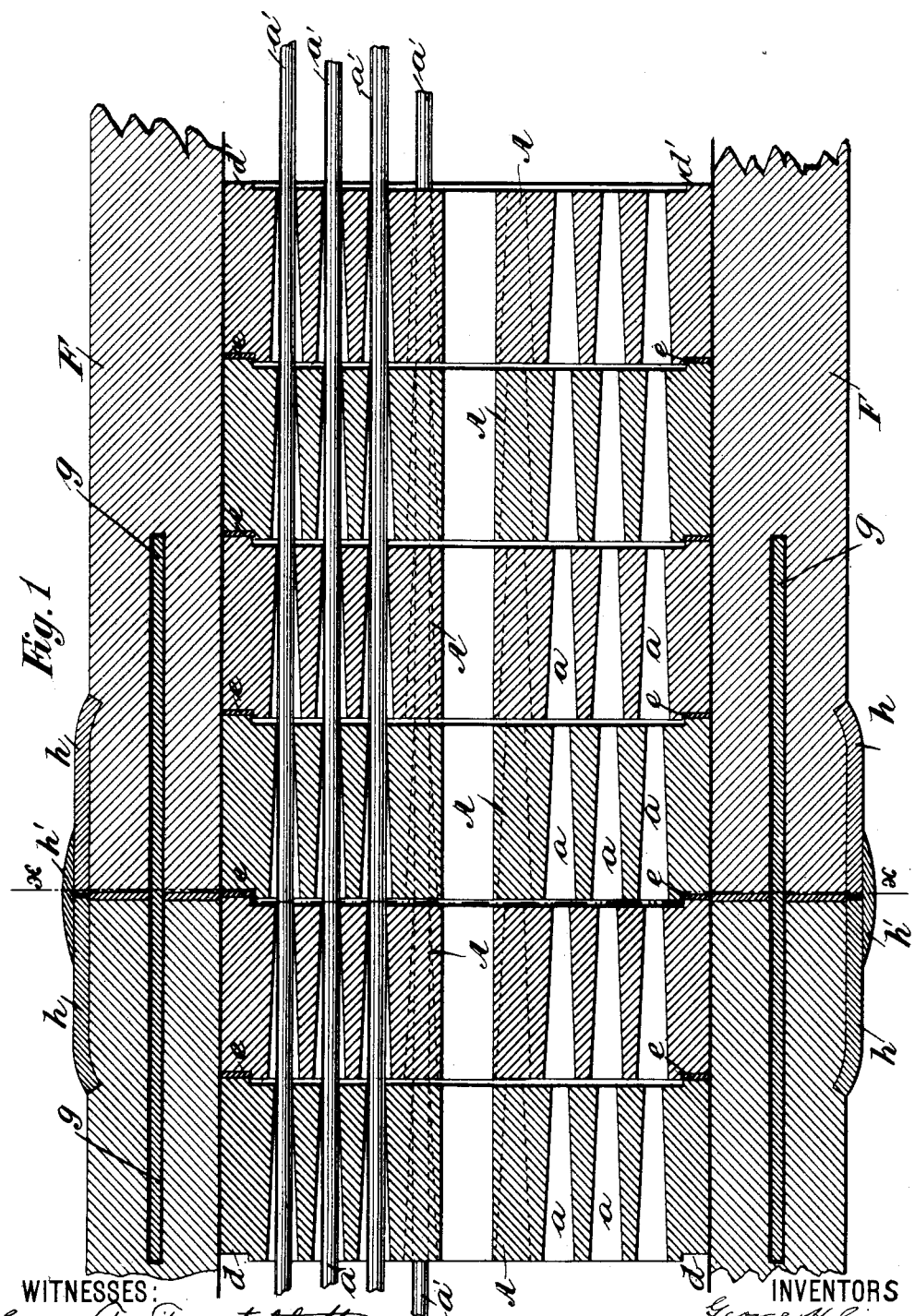

(No Model.) 3 Sheets—Sheet 1.

G. H. & K. C. GILLETTE.
CONDUIT FOR ELECTRICAL CONDUCTORS.

No. 401,155. Patented Apr. 9, 1889.

WITNESSES:
INVENTORS (No Model.) 3 Sheets—Sheet 2.

G. H. & K. C. GILLETTE.
CONDUIT FOR ELECTRICAL CONDUCTORS.

No. 401,155. Patented Apr. 9, 1889.

WITNESSES:

INVENTORS
George H. Gillette,
BY King C. Gillette,
Hubert H. Ranning
ATTORNEY (No Model.) 3 Sheets—Sheet 3.
G. H. & K. C. GILLETTE.
CONDUIT FOR ELECTRICAL CONDUCTORS.
No. 401,155. Patented Apr. 9, 1889.
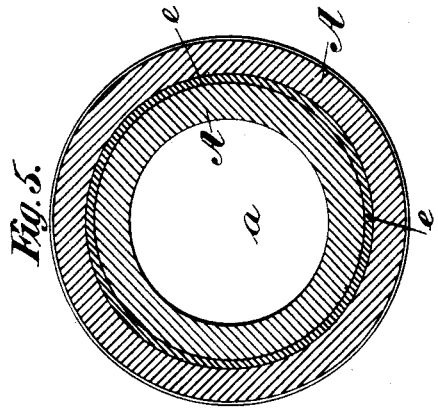
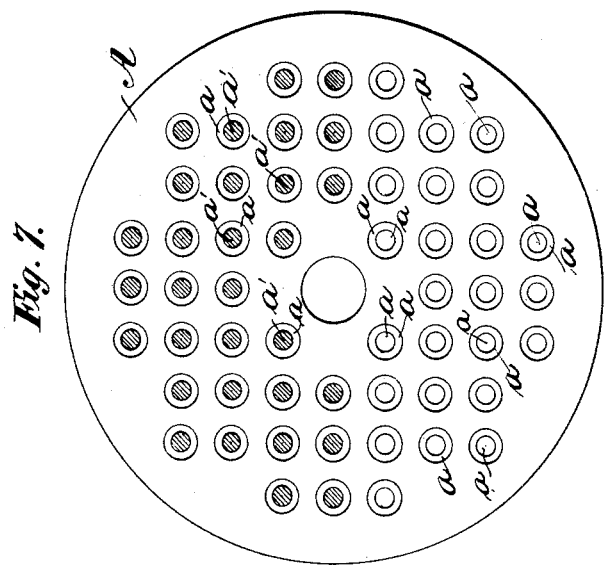
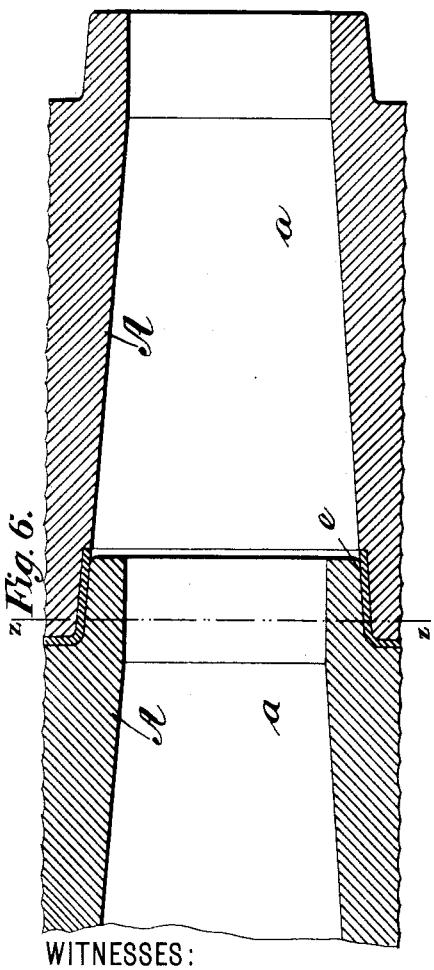
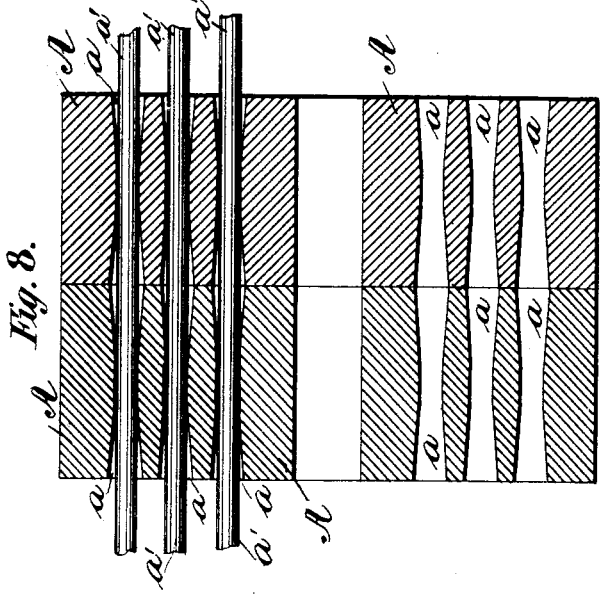
WITNESSES:
Edw. F. Tourtellotte.
R. G. Monroe.
INVENTORS
George H. Gillette.
King C. Gillette,
BY
Hubert A. Banning
ATTORNEY

UNITED STATES PATENT OFFICE.

GEORGE H. GILLETTE AND KING C. GILLETTE, OF NEW YORK, N. Y.

CONDUIT FOR ELECTRICAL CONDUCTORS.

SPECIFICATION forming part of Letters Patent No. 401,155, dated April 9, 1889.

Application filed January 17, 1889. Serial No. 296,633. (No model.)

*To all whom it may concern:*

Be it known that we, GEORGE H. GILLETTE and KING C. GILLETTE, citizens of the United States, and residents of the city of New York, county and State of New York, have invented certain new and useful Improvements in Conduits for Electrical Conductors, &c., of which the following is such a full, clear, concise, and exact description as will enable others skilled in the art to which our invention appertains to make and use the same, reference being had to the accompanying drawings, forming part of this specification.

Our invention relates more particularly to that class of conduits, which are employed for containing electrical conductors when placed under ground, and to tubes and conduits used for pneumatic purposes.

The objects of our invention are the construction of a tube or conduit provided with one or more suitable ducts adapted for the transmission of packages or to receive electrical conductors, as the case may be, and through which the package may be projected or the wire or cable inserted or withdrawn with the least frictional resistance, and to make a conduit which, while comparatively rigid, will possess sufficient elasticity and toughness to adapt itself to slight depressions, and besides being strong and durable will be tight and impervious to moisture, remain unaffected by climatic changes, and afford thorough and complete insulation. To accomplish these objects, the improved conduit is composed of a series of sections of non-conducting material—preferably glass—provided with longitudinal openings, said sections being arranged one after another with the corresponding openings in line, so as to form a continuous duct or a number of continuous ducts. The openings in the various sections either taper through the entire length of their respective sections or have at some point a contracted diameter with inclined approaching surfaces, in order to provide bearings at intervals and limit the frictional area of the ducts. Between the sections we prefer to interpose a non-conducting elastic packing or cement to seal against moisture, and inclose the whole in a compressed wooden tube or casing. The sections may, however, be surrounded by any suitable wrapping or casing, or held together by a rod passing through the center.

Figure 2:
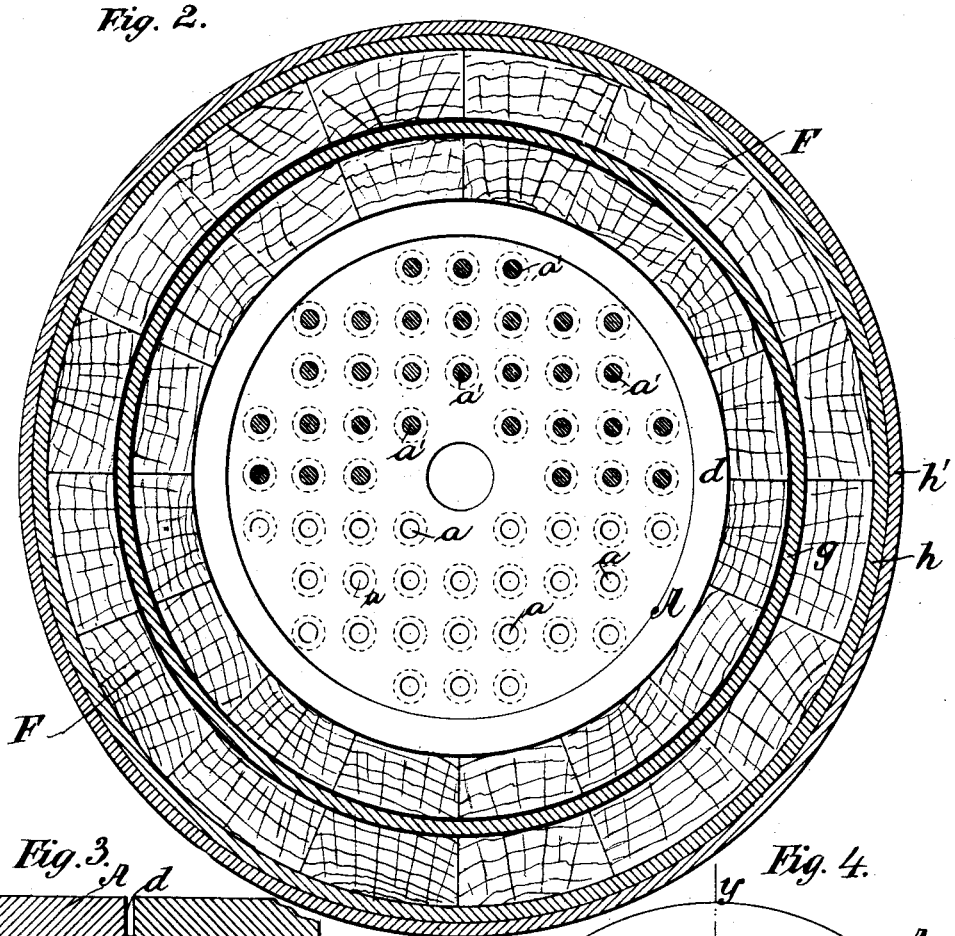
Figure 3:
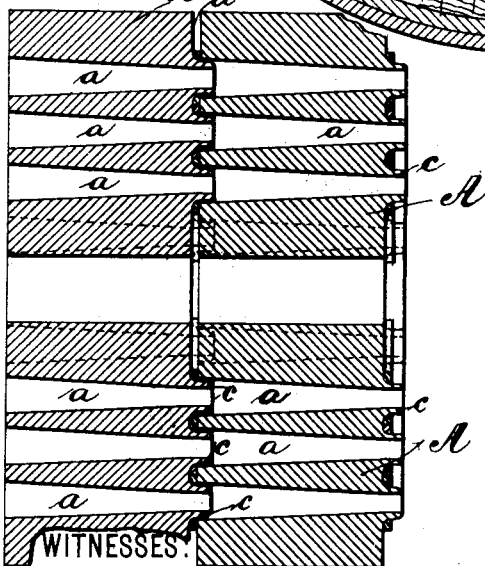
Figure 4:
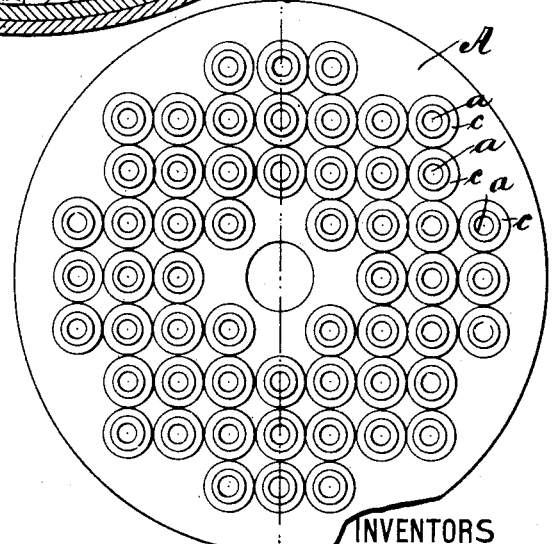

In the accompanying drawings, Figure 1 is a longitudinal sectional view of a portion of conduit embodying our improvements; and Fig. 2 is a cross-section of the same, taken on the irregular line $x\ x$ of Fig. 1. Fig. 3 is a longitudinal sectional view of two of the glass sections, showing small projecting flanges about the smaller ends of the openings, and is taken on the line $y\ y$ of Fig. 4, which is an end view of the same. Fig. 5 is a cross-section on the line $z\ z$ of Fig. 6, which is a longitudinal view of glass cylinders provided with a single large duct. Fig. 7 is an end view of one of the sections containing a number of openings; and Fig. 8 is a longitudinal sectional view showing another modification, the contracted portions of the openings being in the center of the sections.

The sections A A of glass we prefer to form of short cylinders, provided with tapering longitudinal openings $a\ a$, and arranged so that the corresponding openings through succeeding sections are in line, the smaller ends of the openings in one section connecting with the larger ends of the openings in the next, thus making a series of ducts in which are inserted the wires $a'\ a'$. In Figs. 1 and 2 the sections A A, as shown, are formed with plain or even ends or faces, while in the sections shown in Figs. 3 and 4 small annular flanges $c\ c$, about the small ends of the openings in one section, are arranged to project into large ends of the corresponding openings in the succeeding section. The sections or glass cylinders A A are also shown as provided at one end with shoulders $d\ d$ and at the other with flanges $d'\ d'$, and between the joint formed by two sections may be placed rubber washers $e\ e$; or any suitable packing or cement may be interposed to give elasticity to the structure and prevent the admission of any moisture. If desired, the washers may be formed with openings corresponding to those in the sections and extended entirely between the adjacent surfaces of the section; or in the modification shown in Figs. 3 and 4 separate washers may be placed around each of the small annular flanges c c.

To give further insulation, and as an additional preventive against moisture, the sections A A when placed in position may be enveloped in a wrapping of paraffined paper or equivalent material before being incased in the wooden tubing F, which is preferably compressed together circumferentially about the sections A A as a central core.

The compressed wooden tubing F, which is more particularly described in another application, entitled "improvement in tubes and conduits," filed January 17, 1889, Serial No. 296,637, may be made in convenient lengths, held together by retaining-bands $h\ h$, joined and sealed, as shown in Fig. 1, by sleeve $g$ and solder-joint $h'$, with the sections A A at adjacent ends brought closely together, so as to form a continuous unbroken structure. The sections A A may be held together by a rod passing through a central opening, or they may be drawn tightly together on such rod, and the latter removed after the wooden tubing has been adjusted.

The outer rounded surfaces of the short cylinders on sections A A may in addition be beveled, roughened, or corrugated, as indicated in Fig. 6, to avoid all danger of their slipping or turning in the casing.

For convenience of illustration, only conduits of small size have been shown in the drawings, the ducts in all the figures except 5 and 6 being adapted for receiving single wires; but it is plain that by simply enlarging the size we can have a conduit with a series of ducts for cables.

It is readily seen that a conduit of such construction will be strong and durable, impervious to moisture, and unaffected by climatic changes, and at the same time afford complete protection and insulation to the electrical conductors. Moreover, the continuous ducts formed by the tapering openings being of expanded and contracted diameter the surfaces about the contracted portions afford bearings for the wires or cables, and by thus limiting the frictional area allow the more easy insertion and withdrawal of the same. This feature is also of great importance when a duct is used for pneumatic purposes.

Having thus described our invention, what we claim as new, and desire to secure by Letters Patent, is—

1. A conduit comprising a series of sections of non-conducting material, as glass, provided with contracting longitudinal openings, said sections being arranged and secured one after another with the corresponding openings in line, whereby one or more continuous ducts with bearings at intervals are formed, substantially as set forth.

2. A conduit comprising a series of sections of non-conducting material, as glass, provided with tapering longitudinal openings, said sections being arranged and secured one after another with the larger ends of the openings in the succeeding sections adjacent to the smaller ends of the openings in the immediately preceding sections, substantially as and for the purposes set forth.

3. A conduit comprising a series of sections of non-conducting material, as glass, and intermediary washers or packings, said sections being provided with contracting longitudinal openings and secured one after another with the corresponding openings in line, substantially as and for the purposes set forth.

4. A conduit comprising a series of inner sections of non-conducting material, as glass, and an outer covering or casing, said sections being provided with contracting longitudinal openings arranged one after another with the corresponding openings in line, substantially as and for the purposes set forth.

5. A conduit consisting of a series of sections of non-conducting material, as glass, intermediary packings or washers, and a compressed outer wooden casing, said sections being provided with contracted longitudinal openings and secured within said casing with the corresponding openings in line, substantially as described.

GEORGE H. GILLETTE.
KING C. GILLETTE.

Witnesses:
R. G. MONROE,
L. T. GRIFFITH.